US009491910B2

(12) United States Patent
Schroeder

(10) Patent No.: US 9,491,910 B2
(45) Date of Patent: Nov. 15, 2016

(54) ERGONOMIC GARDENING CONTAINER

(75) Inventor: Rick E. Schroeder, Temple, TX (US)

(73) Assignee: ERGO GARDEN LLC, Temple, TX (US)

( * ) Notice: Subject to any disclaimer, the term of this patent is extended or adjusted under 35 U.S.C. 154(b) by 530 days.

(21) Appl. No.: 13/474,306

(22) Filed: May 17, 2012

(65) Prior Publication Data

US 2013/0305602 A1    Nov. 21, 2013

(51) Int. Cl.
*A01G 9/02*    (2006.01)
*A01G 25/00*    (2006.01)
*A01G 9/16*    (2006.01)

(52) U.S. Cl.
CPC .. *A01G 9/16* (2013.01); *A01G 9/02* (2013.01)

(58) Field of Classification Search
CPC ........ A01G 31/02; A01G 9/02; A01G 9/025; A01G 1/007; A01G 13/0243; A01G 17/06; A01G 1/002; A01G 1/005; A01G 1/06; A01G 2025/003; A01G 25/06; A01G 25/167; A01G 27/003; A01G 31/001; A01G 31/06
USPC ...... 47/21.1, 65.5, 79, 59 R, 62 R, 60, 62 E, 47/61, 29.1, 65, 66.7, 69; D11/143, 144, D11/145, 152, 153, 154
See application file for complete search history.

(56) References Cited

U.S. PATENT DOCUMENTS

| 3,672,571 | A | * | 6/1972 | Goodricke | 239/145 |
|---|---|---|---|---|---|
| 3,822,504 | A | * | 7/1974 | Kuehn et al. | 47/62 R |
| 4,397,114 | A | * | 8/1983 | Skaife | 47/81 |
| 4,651,466 | A | * | 3/1987 | Robinson | 47/19.1 |
| 4,683,674 | A | * | 8/1987 | Faul | 47/83 |
| 4,751,792 | A |  | 6/1988 | Robinson |  |
| 4,847,926 | A |  | 7/1989 | Laputka |  |
| 4,869,018 | A | * | 9/1989 | Scales et al. | 47/33 |
| D321,839 | S | * | 11/1991 | Rosato | D11/130.1 |
| 5,400,544 | A |  | 3/1995 | Wien |  |
| D386,114 | S | * | 11/1997 | Carson | D11/143 |
| 6,266,921 | B1 | * | 7/2001 | Keskilohko | 47/86 |

(Continued)

FOREIGN PATENT DOCUMENTS

| WO | 2012/030237 A2 | 3/2012 |
|---|---|---|
| WO | 2012040462 A2 | 3/2012 |

OTHER PUBLICATIONS

Raised Vegetable Garden Instructions, http://www.raw-food-health.net/raisedvegetablegarden.html [retrieved on Sep. 2, 2014] Apr. 24, 2009, 6 pages.*

(Continued)

*Primary Examiner* — Andrea Valenti
(74) *Attorney, Agent, or Firm* — David G. Henry, Sr.

(57) ABSTRACT

Provided is a raised-bed gardening container, including a base, a feeding tube, and a cover frame. The base may include a bottom edge; a top rim at least 36 inches above the bottom edge; an exterior sidewall extending between the bottom edge and the top rim; an interior sidewall extending from the top rim to a bottom interior, the interior sidewall and bottom interior defining an interior volume for containing a gardening media, the interior volume having a diameter of greater than approximately four feet; a feeding tube support generally centrally disposed in the base; and a gardener passage extending to the feeding tube support and having a width configured to allow a gardener to walk through the gardener passage to the feeding tube support.

18 Claims, 13 Drawing Sheets

(56) References Cited

U.S. PATENT DOCUMENTS

| | | | |
|---|---|---|---|
| 6,370,816 B1 * | 4/2002 | Rosato | 47/40.5 |
| 6,434,882 B1 | 8/2002 | Becker | |
| D491,487 S * | 6/2004 | Buss | D11/152 |
| 7,024,818 B2 * | 4/2006 | Maniscalco et al. | 47/65.6 |
| 7,490,435 B2 * | 2/2009 | Singer | 47/19.1 |
| 7,565,765 B2 * | 7/2009 | Brooke et al. | 47/62 R |
| D641,653 S * | 7/2011 | Gregson | D11/143 |
| D646,129 S * | 10/2011 | Hoff | D8/1 |
| 2007/0130824 A1 * | 6/2007 | Teich | 47/21.1 |
| 2008/0236040 A1 * | 10/2008 | Sheaffer et al. | 47/65.6 |
| 2008/0313959 A1 | 12/2008 | Singer | |
| 2009/0133324 A1 | 5/2009 | Cannon | |
| 2009/0293350 A1 | 12/2009 | Kania et al. | |
| 2010/0192460 A1 | 8/2010 | Hart et al. | |
| 2011/0148124 A1 | 6/2011 | Soejima | |
| 2011/0197507 A1 | 8/2011 | Cameron | |
| 2011/0232174 A1 * | 9/2011 | Mills | 47/20.1 |
| 2013/0061521 A1 * | 3/2013 | Cudmore | 47/83 |

OTHER PUBLICATIONS

Unlock your creativity with keyhole garden, by Ricky Kemery, http://www.journalgazette.net/article/20120129/feat0106/301299980/1014/sports09 [retrieved on Sep. 2, 2014] Jan. 29, 2012, 4 pages.*

The Original EarthBox-EarthBox; retrieved from www.earthbox.com/The-Orginal-EarthBox/productes/52/; Mar. 30, 2012; 2 pages.

Keyhole Gardens; retrieved from www.facebook.com/keyholegardens; Mar. 30, 2012; 17 pages.

Keyhole Farm; Keyhole Gardens—Key to the Future!; retrieved from www.keyholefarm.com; Mar. 30, 2012; 7 pages.

Dr. Deb's Sustainable Living; retrieved from www.debtolman.com; 2008-2011; 3 pages.

How to Build Your Keyhole Garden; Mar. 30, 2012; 2 pages.

Curved Designs; Build Your Own Curved Designs, Sandbox Kit, Playground Border or Raised Garden Bed at Frame It All; retrieved from www.frameitall.com/curved-timber-edging.html; Mar. 30, 2012; 3 pages.

* cited by examiner

ERGONOMIC GARDENING CONTAINER

BACKGROUND OF THE INVENTION

1. Field of the Invention

The present invention relates generally to gardening, and more specifically, to gardening containers.

2. Description of the Related Art

Many traditional gardening containers are difficult to use, particularly for those with a limited range of movement. Bending over to reach ground-level gardening containers can be difficult and uncomfortable, and many raised-bed gardening containers are too low to satisfactorily address this problem. Such challenges are amplified for those gardeners seeking to benefit the environment by composting waste material for use in their gardening containers, as many compost containers are also relatively low to the ground, and transferring material from the compost container to the gardening container can be labor intensive and unpleasant. Moreover, raised-bed gardening containers are generally expensive, particularly larger and higher containers, in part, because the containers consume a relatively large amount of retail and warehouse shelf space prior to their sale. These size-related problems are also felt by gardeners seeking to store such containers, e.g., outside of the growing season. Other weaknesses of many gardening containers include the lack of a readily attached protective cover to provide a greenhouse or shade, depending on the weather.

SUMMARY OF THE INVENTION

The following is a non-exhaustive listing of some aspects of the present techniques. These and other aspects are described in the following disclosure.

In some aspects, the present invention includes a raised-bed gardening container, including a base, a feeding tube, and a cover frame. The base, in some aspects, includes a bottom edge; a top rim at least 36 inches above the bottom edge; an exterior sidewall extending between the bottom edge and the top rim; an interior sidewall extending from the top rim to a bottom interior, the interior sidewall and bottom interior defining an interior volume for containing a gardening media, the interior volume having a diameter of greater than approximately four feet; a feeding tube support generally centrally disposed in the base; and a gardener passage extending to the feeding tube support and having a width configured to allow a gardener to walk through the gardener passage to the feeding tube support. In some aspects, the feeding tube is configured to be coupled to the feeding tube support and reside approximately centrally within the interior volume to collect compost and convey water into the gardening media. The feeding tube may include a plurality of apertures operable to convey water into the gardening media and an upper aperture disposed adjacent the gardener passage when the feeding tube is coupled to the feeding tube support and operable to receive water and compost material. The cover frame may be configured to be coupled to the base and support a protective cover over the interior volume of the base.

Some aspects include a gardening container, including a base being a monolithic body of a single material and having an exterior sidewall sloping in a direction; an interior sidewall sloping in an opposing direction and defining an interior volume for containing a gardening media; and a gardener passage extending to the feeding tube support and having a width configured to allow a gardener to walk through the gardener passage to the feeding tube support, wherein the base is stackable such that a plurality of substantially identical bases, when stacked, each contain more than 50 percent of an adjacent base.

Some aspects include a gardening container, including a stackable base being a monolithic body of a thermoplastic, a feeding tube, a cover frame, and a plurality of layers of gardening media. The base may include a bottom edge; a top rim at least 36 inches above the bottom edge; an exterior sidewall extending between the bottom edge and the top rim; an interior sidewall extending from the top rim to a bottom interior, the interior sidewall and bottom interior defining an interior volume for containing a gardening media, the interior volume having a diameter of greater than approximately four feet; a feeding tube support generally centrally disposed in the base; and a gardener passage extending to the feeding tube support and having a width configured to allow a gardener to walk through the gardener passage to the feeding tube support. The feeding tube may be coupled to the feeding tube support and residing approximately centrally within the interior volume to collect compost and convey water into the gardening media. The feeding tube may include a plurality of apertures operable to convey water into the gardening media; and a top aperture disposed adjacent the gardener passage and operable to receive water and compost material. The plurality of layers of gardening media may be disposed within the interior volume and may include a bottom layer of porous material configured to provide drainage; a second layer on the bottom layer of recyclable material subject to composting; a third layer of soil on the second layer and in which plants are to be planted, wherein the bottom layer, the second layer, and the third layer slope downward four to six inches away from the feeding tube.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
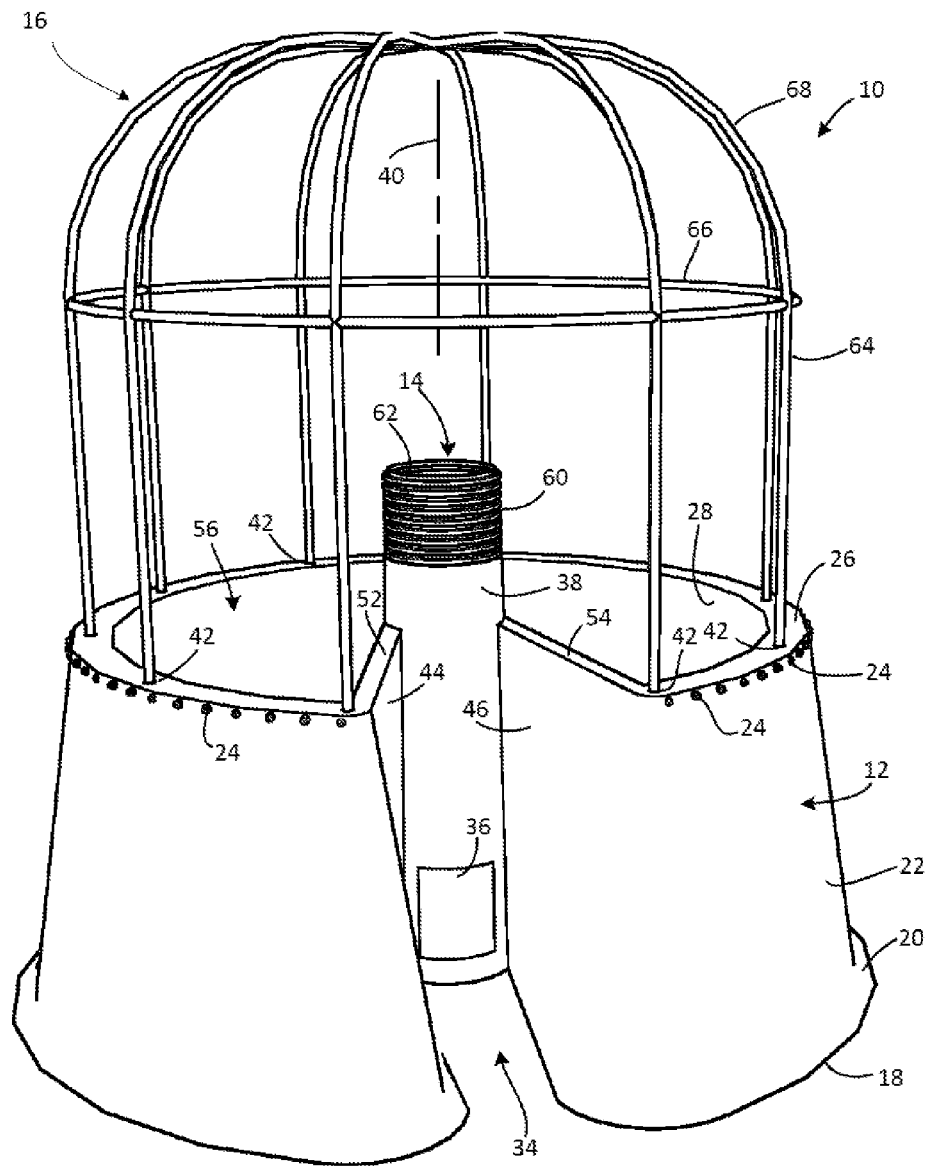
FIG. 1 illustrates a gardening container in accordance with some embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Some, and in some cases all, of the above-mentioned deficiencies in certain existing gardening containers are mitigated by an exemplary gardening container 10 illustrated by FIG. 1. As explained in greater detail below, some embodiments of the gardening container 10 support gardening media, such as soil, at a height that is relatively ergonomic for gardeners. Further enhancing the ergonomics of the gardening container 10, some embodiments are shaped to allow a gardener to position themselves near the center of the gardening container, thereby placing much of the surface of the gardening media within reach of the gardener. Embodiments of the gardening container 10 are also expected to provide certain environmental benefits by facilitating water and soil conservation through use of an integrated composter that feeds compost tea into the gardening media and receives waste material generated during gardening or other activities. Some embodiments are, in large part, integrally formed from relatively few pieces, facilitating assembly of the gardening container 10 and lowering manufacturing costs, and larger components of the gardening container 10, in some embodiments, are shaped to be stackable, thereby reducing the amount of space consumed by the gardening container 10 when not in use, for example when in storage or when on a retail sales floor or in a warehouse. Finally, some embodiments of the gardening container 10 facilitate use of a protective cover to expand the growing season with a greenhouse during colder weather and shade during warmer weather. These and other aspects of the gardening container 10 are explained in greater detail below, after introducing the components of the gardening container 10.

As shown by FIG. 1, in some embodiments, the gardening container 10 includes a base 12, a feeding tube 14, and a cover frame 16. The base 12 holds the gardening media in which plants are grown and forms the support structure for the other components 14 and 16. The feeding tube 14, in some embodiments, is removably inserted into the base 12 and provides a chamber in which waste material is composted and through which water is applied to the gardening media. The cover frame 16 is also, in some embodiments, removably inserted into the base 12 and provides a support structure upon which sheets of protective material, such as shade fabric, deer netting, or translucent plastic, are attached to modulate or protect the environment in which plants are grown.

The base 12, in the illustrated embodiment, includes a bottom edge 18, a fillet 20, an exterior side wall 22, fasteners 24, a top rim 26, an interior side wall 28, an interior fillet 30 (visible in FIG. 2), a bottom interior surface 32 (FIG. 2), a gardener passage 34 (FIG. 1), a compost access door 36, and a feeding tube support 38. Generally, the fillets 20 and 30 flare away from their respective walls 22 and 28 to enhance stability. And to facilitate ergonomic access to the gardening container 10, the sidewalls 22 and 28 raise the top rim 26 to approximately waist height, and the gardener passage 34 allows a gardener to position themselves within arms' reach of plants, except, in some embodiments, plants over the feeding tube 14. To encourage composting, the feeding tube support 38 holds the feeding tube 14 near the end of the gardener passage 34, and the compost access door 36 provides ready access to composted material for ergonomic compositing while gardening.

The base 12 may be made of a variety of materials, including a properly formed sheet of material generally having a uniform thickness, which may include a single material or a composite material. For example, the base 12 may be formed into a sheet having the illustrated shape from a moldable plastic, such as injection molded, vacuum formed, or rotary-cast plastic, for instance a thermoplastic polymer like polypropylene. In another example, the base 12 may be formed from a composite material, such as fiberglass having fibers positioned with a hand layup process or with a spray layup process, for instance over a mold coated with a mold-release agent and generally having the shape of the illustrated base 12. In some embodiments, the base 12, with the exception of fasteners 24, is integrally formed from a monolithic body of material (e.g. substantially entirely from a single body of polypropylene), a technique which is expected to yield relatively low manufacturing costs due a low part-count for the base 12. An integrally formed base 12 is also expected to enhance strength by reducing or eliminating seams between components that would otherwise concentrate stresses. In other embodiments, though, the base 12 may be formed from multiple pieces, for example by bolting components together or by interlocking slots and tabs on adjacent components. In some embodiments, the base 12 may be made from a colored material, such as colored plastic, or (and/or) a pattern may be applied to the exterior, e.g., by screen printing simulated bricks or wood slats, or by applying inserts having such an appearance.

The bottom edge 18 terminates the fillet 20, which extends down and outward from the exterior side wall 22 in the illustrated embodiment. The fillet 20 places the edge 18 further outward radially from a central axis 40 of the gardening container 10 than would otherwise occur, thereby providing a relatively wide base and relatively stable support for the base 12. Maintaining stability is expected to be helpful in embodiments that contain a relatively large amount of heavy growing media and elevate the growing media relatively high. Further, the fillet 20 is expected to reduce the likelihood of the exterior side wall 22 collapsing, for example denting, when a force is applied radially inward, for instance if a person leans against the side wall 22. Other embodiments, however, do not necessarily include the fillet 20, which is not to suggest that any other feature described herein is required in all embodiments.

The illustrated exterior side wall 22, in some embodiments, has a generally conical shape (e.g., approximately a frustum of a right circular cone) that is generally rotationally symmetric about the central axis 40, with the upper portion near the top rim 26 being radially narrower than the lower portion near the bottom edge 18. Again, the shape is selected to position the bottom edge 18 radially outward and enhance stability, though embodiments are not limited to gardening containers providing this benefit, as is the case with the other benefits of various embodiments described herein. In some cases, the outer sidewall 22 and other portions of the base 12 may include structures to enhance rigidity, such as fins, ribs, or other deviations in the shape of the outer sidewall 22. In some cases, a pattern may be formed in the outer sidewall 22 to simulate the appearance of bricks and mortar, slats of wood, or a stone wall, both to enhance rigidity and for aesthetic reasons. Or some embodiments may include recesses with fasteners for receiving aesthetic inserts, such as wooden panels or simulated brick inserts.

In some embodiments, the fasteners 24 are generally disposed at approximately the same height around the exterior side wall 22 near the top rim 26, for example generally radially symmetrically about the central axis 40. The illustrated fasteners 24 are male portions of snaps riveted into holes through the exterior side wall 22. Other embodiments may include other types of fasteners 24 (or no fasteners, which is not to suggest that other features are required of all embodiments), such as eyelets, hooks, zippers, hook and loop fasteners, and the like. The fasteners 24 function to secure a cover, such as shade cloth, deer netting, or translucent or transparent plastic sheets supported by the cover frame 16. Distributing the fasteners 24 generally radially symmetrically and generally near one another, for example within 10 inches of one another or less, is expected to mitigate the concentration of stress in the protective sheet attached to the cover frame 16, as might occur during a relatively strong wind. In some cases, the fasteners 24 are also disposed along the gardener passage 34 to support portions of a cover extending along the passage 34.

In the illustrated embodiment, the top rim 26 extends horizontally radially inward from the outer sidewall 22 to the inner sidewall 28 and is generally flat and generally circular, with the exception of the gardener passage 34. In some embodiments, the top rim 26 is wide enough for a person to rest their elbows or hands on when gardening, for example, the top rim 26 may be between 3 and 5 inches wide, such as approximately 4 inches wide. The top rim 26 may meet the sidewalls 22 and 28 in a chamfered region having a radius selected to avoid sharp edges contacted by the gardener and to avoid stress concentrations, e.g., a radius less than approximately 5 mm and greater than approximately 1 mm. In some embodiments the strength of the base 12 may be enhanced by fins extending downward from the top rim 26 and between the sidewalls 22 and 28. Such fins, in some cases, may extend downward through a portion of the height of the base 12 (e.g., less than 10 inches) to facilitate stacking, as discussed below with reference to FIG. 6.

The top rim 26, in the illustrated embodiment, is also wide enough to provide space for a plurality of apertures 42 that receive the cover frame 26. In some embodiments, the apertures 42 are generally radially symmetrically disposed about the central axis 40 and extend generally parallel to the central axis 40, downward. For example, the apertures 42 may be ends of tubes 43 (FIG. 5) that extend downward, for instance approximately 4 to 6 inches, to stabilize the cover frame 16. The tubes 43, in some cases, are joined to the sides 22 and 28 with fins or webbing to enhance their strength. Or in some embodiments, the apertures 42 are holes merely extending through the thickness of the base 12. Some embodiments include approximately 9 such apertures 42 to distribute portions of the cover frame 16 relatively regularly under a cover and support the cover in stronger winds.

In some embodiments, the inner sidewall 28 extends generally downward from the top rim 26. The illustrated inner sidewall 28 has a generally conical shape (e.g., approximately a frustum of a right circular cone) that is inverted relative to the outer sidewall 22. That is, in the illustrated embodiment, the lower portion of the inner sidewall 28 is closer to the central axis 40 than the upper portion of the inner sidewall 28. In this embodiment, the inner sidewall 28 is generally radially symmetric about the central axis 40, with the exception of the gardener passage 34. The inner sidewall 28 may include fins, ridges, or other structures to enhance rigidity in some embodiments.

Figure 2:
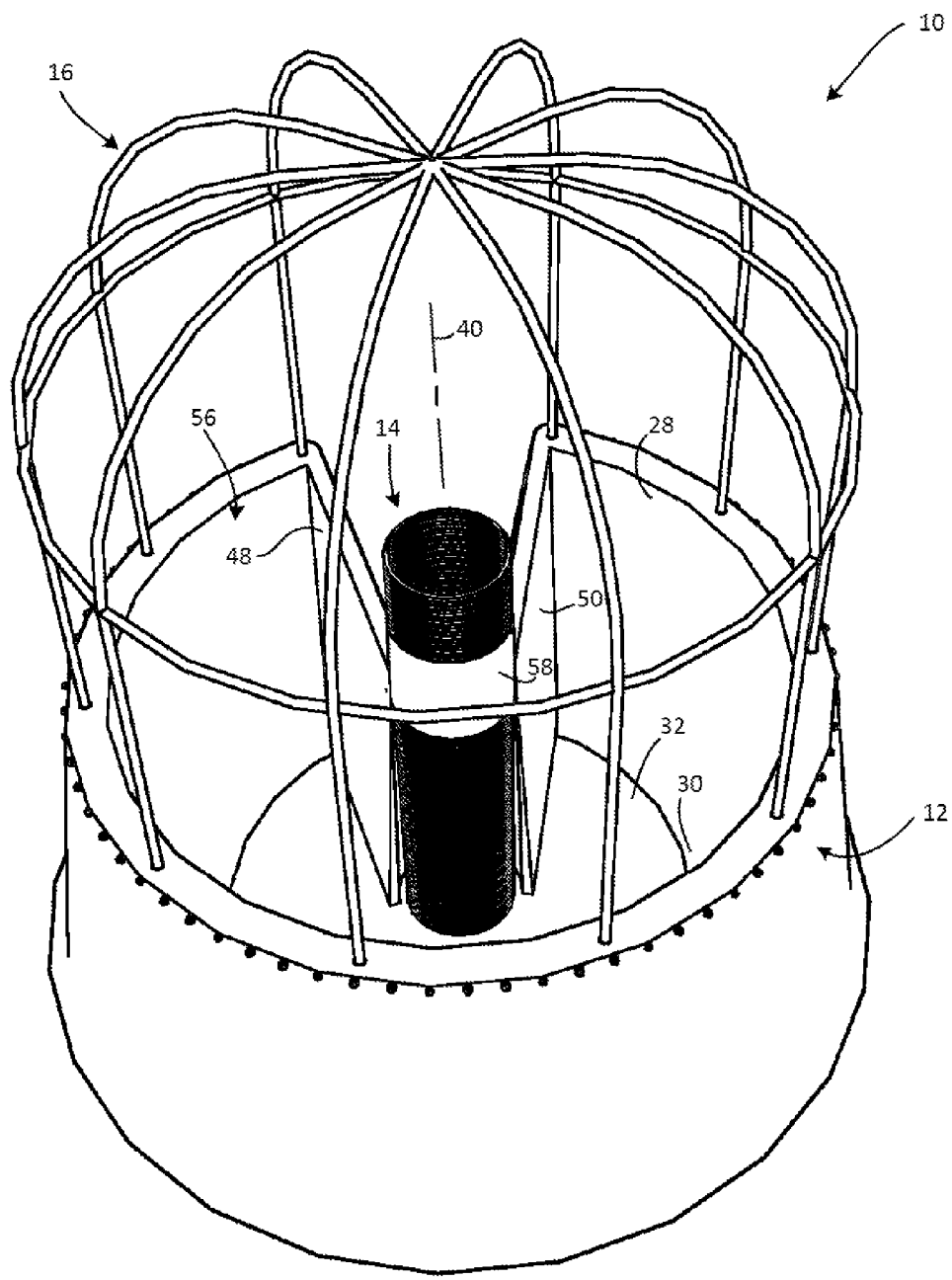
FIGS. 2 and 3 are perspective views of the gardening container of FIG. 1.

FIG. 2 illustrates the bottom fillet 30 of the present embodiment, which extends from the inner sidewall 28 to the bottom surface 32. The curved shape of the fillet 30 is expected to enhance the rigidity of the inner sidewall 28 and reduce the likelihood of stress concentrations, as might arise from stones, or other sharp objects within the gardening media, denting or distorting the shape of the inner sidewall 28.

The bottom surface 32, in some embodiments, is generally flat, and generally normal to the central axis 40. In some embodiments, the bottom surface 32 extends fully between the inner sidewalls 28 to form a closed receptacle for gardening media (e.g., a water-tight container), thereby facilitating use of the gardening container 10 in urban environments, for example on apartment building balconies. In some cases, the bottom surface 32 includes a drain, e.g., a threaded aperture to receive a drainage tube for directing water in a controlled fashion off an apartment balcony. The bottom surface 32, in some cases, may include an integrally formed (or attached) pattern of fins, ridges, or other structures to enhance rigidity across the bottom surface 32. In other embodiments, the bottom surface 32 is omitted, which is not to suggest that other features described herein may not also be omitted in certain embodiments.

FIG. 1 illustrates the gardener passage 34, which in this embodiment, extends radially inward from the outer sidewall 22 to the feeding tube support 38. The gardener passage 34 may be generally perpendicular to the central axis 40 and may have a width, such as a minimum width, selected to accommodate a person walking through the gardener passage 34. In some instances, the gardener passage 34 is greater than 6 inches wide, greater than 8 inches wide, or greater than 12 inches wide at the narrowest region. The gardener passage 34 is defined by exterior sidewalls 44 and 46 which meet with interior sidewalls 48 and 50 (FIG. 2) at a passage top surface 52 or 54. The exterior sidewalls 44 and 46 may generally slope away from one another, tending to be further from one another higher from the bottom edge 18 to accommodate human hips, which are generally wider than a person's feet, and to enhance stability. The interior sidewalls 48 and 50 may have an opposite slope, also to enhance stability and resists forces from a person leaning against the top surfaces 52 or 54.

The feeding tube support 38 (FIG. 1), in some embodiments, defines a conical shape (e.g., a frustum of a right-circular cone) extending along the central axis 40 and extending between the sidewalls 44, 46, 48, and 50 to support the feeding tube 14 and contain the gardening media within the interior 56 of the base 12. In some embodiments, the feeding tube support 38 includes a top portion 58 (FIG. 2) that extends fully (or substantially fully, e.g., to resiliently clip the feeding tube 14) around the feeding tube 14 to hold the feeding tube 14 in position. The feeding tube support 38 may have a smaller diameter near the top than near the bottom to facilitate stacking of instances of the base 12, as described in greater detail below with reference to FIG. 6.

Figure 3:
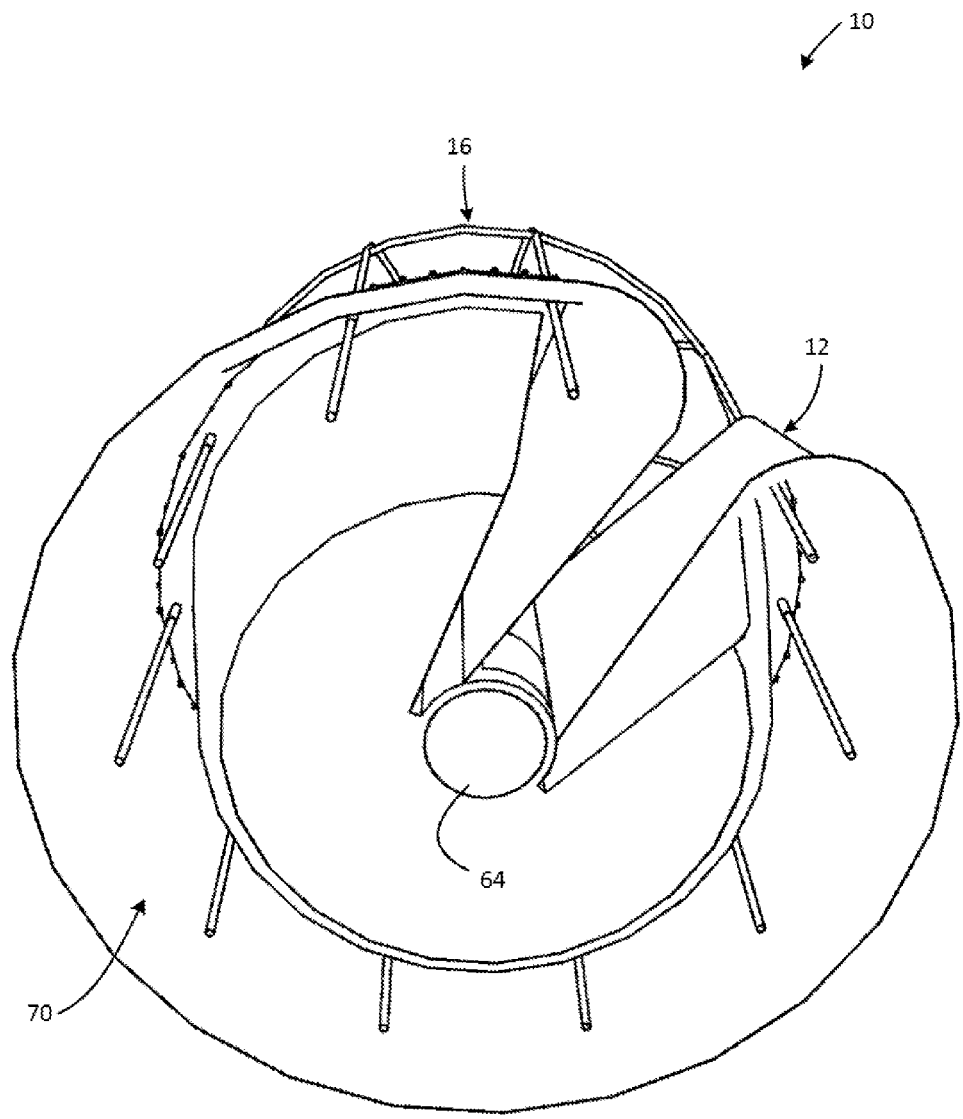
Figure 4:
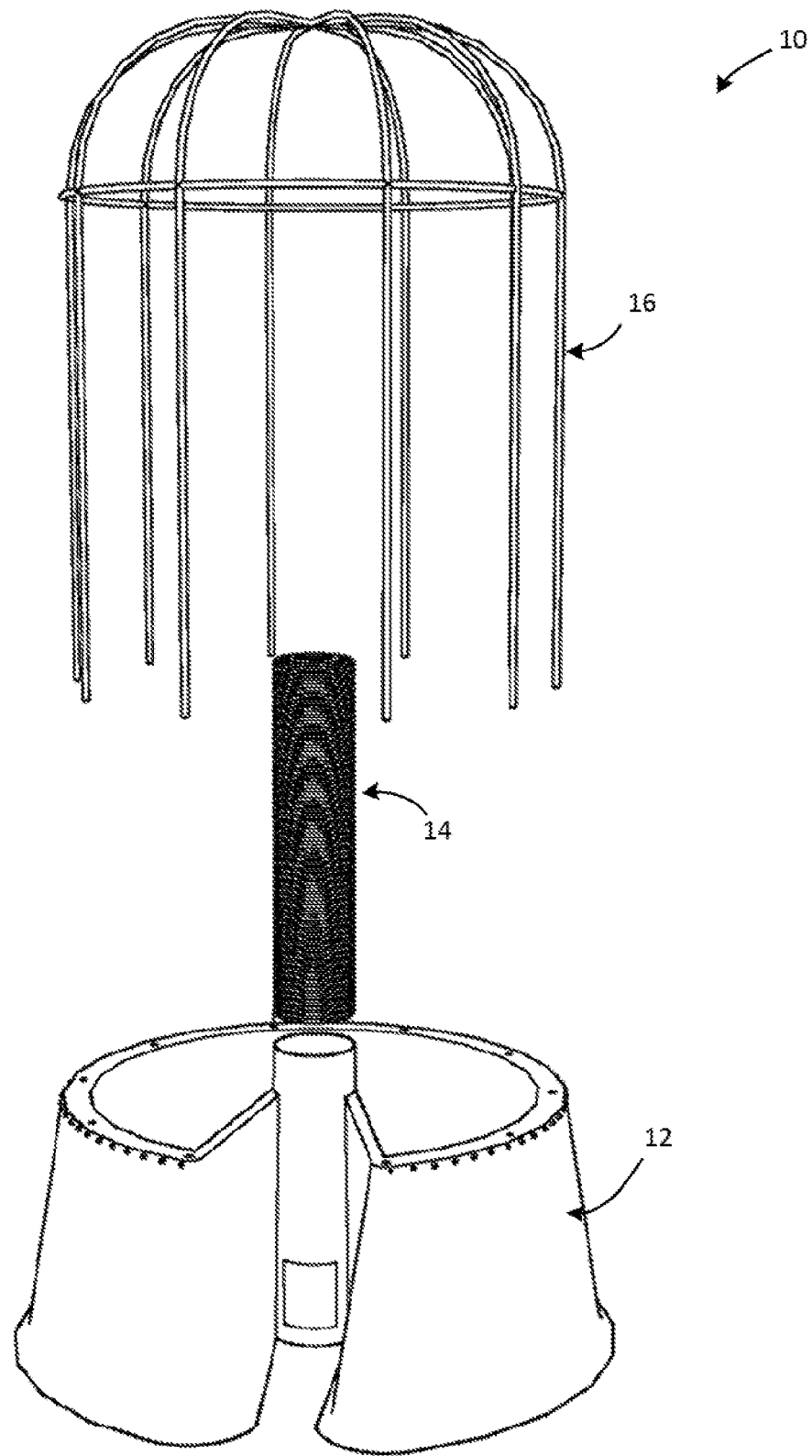
FIG. 4 is an exploded perspective view of the gardening container of FIG. 1.

In some embodiments, the feeding tube 14 is removably placed within the feeding tube support 38, again to facilitate stacking of the base 12 when the feeding tube 14 is removed. The feeding tube 14 may have a generally right cylindrical shape or the tube may have some other shape configured to allow compost to collect and water to pass into the gardening media, e.g., a lower chamber may be wider than an upper passage. The illustrated feeding tube 14 includes a plurality of ridges 60 that reduce the likelihood of the feeding tube 14 being compressed inward by the gardening media. The feeding tube 14, in some embodiments, includes a plurality of apertures (e.g., an array of more than 20) drilled through the feeding tube 14. These apertures may be approximately ½ inch or smaller to facilitate the flow of fluids from the feeding tube 14 into the gardening media while tending to impede the flow of solids between the gardening media and the feeding tube interior 62. In some embodiments, the bottom of the feeding tube 14 is closed with a plug 64 (FIG. 3), also to contain materials within the feeding tube 14. The feeding tube 14 may be made of a variety of materials, including plastic, such as corrugated drainage pipe having a diameter between 8 and 20 inches, for example approximately 15 inches. The length of the feeding tube may be selected to elevate the feeding tube 14 above the growing media for relatively ergonomic access, and in some embodiments, the feeding tube 14 extends between 40 and 48 inches above the bottom surface 32 (FIG. 2) of the base 12.

In some cases, the feeding tube 14 includes an aperture behind the access panel 36 (FIG. 1) through which processed compost can be removed for adding to the interior 56 of the base 12 and enriching the gardening media. The access panel 36 and aperture behind it may be high enough on the feeding tube 14 that fluids collecting at the bottom of the feeding tube 14 flow into the gardening medium before reaching the bottom edge of the access panel 36 to prevent drainage through the panel 36. In some embodiments, a circular plate near the bottom of the feeding tube 14 is connected via a cable or shaft extending up through the feeding tube 14 to allow a gardener to either lift compost material up to the access panel 36 or fully clear the entire tube 14 by pulling this plate from above.

The cover frame 16 may be removably attached to the base 12 through the apertures 42. In some embodiments, the cover frame 16 is made of a moldable material, such as a plastic, like polyvinylchloride (PVC) pipe, or of a resilient material, such as fiberglass rods. In this embodiment, the cover frame 16 includes a plurality of generally straight cylindrical rods 64 (FIG. 1) extending up to a spreader ring 66, where the rods transition to an inward bending section 68 that continues until the rods meet one another at the central axis 40. The rods 64 may be joined to the spreader ring 66 with a four-way orthogonal pipefitting in the case of PVC pipe or with a four-way orthogonal metal joint, for example formed by welding orthogonal aluminum tubes to one another, in the case of fiberglass rods. The curved portions 68 may meet one another in another ring near the central axis 40 having apertures to receive the curved portions 68 or by intersecting or overlapping one another at the central axis 40.

Some embodiments include a cover having the shape of the cover frame 16. The cover may be made of a variety material selected based on the desired environment within the interior 56. For example, the cover may be a translucent or transparent plastic selected to provide a greenhouse effect within the interior 56 to extend the growing season into colder parts of the year. In another example, the cover may be made of shade cloth selected to protect plants growing in the interior 56 from the sun during warmer parts of the year. In another example, the cover may be a netting material (e.g., deer netting) selected to exclude pests. In some applications, the covers shield plants from excessive watering from rain, protect against foragers such as birds, protect against frost by reducing radiated heat loss, and protect against harmful insects. In some embodiments, the cover may include complementary fasteners that couple with the fasteners 24 around the base 12 to secure the cover to the base 12 and over the cover frame 16. The cover may substantially or entirely enclose the cover frame 16. The cover may be applied by pulling the cover over the cover frame 16 and snapping it or otherwise attaching it to the fasteners 24. In some embodiments, the fasteners 24 extend along the gardener passage 34 to secure the area near this path as well.

In some embodiments, the gardening container 10 is assembled by placing the feeding tube 14 within the feeding tube support 38 and, then, attaching the cover frame 16 and any cover to the base 12. Thus, the garden container 10 can be assembled by attaching four components, and in some embodiments in which the cover frame 16 and the cover are not used, the gardening container 10 can be assembled by merely attaching two components: the feeding tube 14 and the base 12. Consequently, certain embodiments of the gardening container 10 are expected to be relatively easy to assemble for gardeners, particularly those with limited ranges of movement.

Once assembled, the interior 56 may be filled partially or substantially entirely with a gardening media by the gardener. A variety of different types of gardening media may be used, and in some cases, a variety of different types of materials may be used in a single instance. For instance, a first layer approximately 4 to 6 inches deep may include rocks, cans, Styrofoam, or other materials selected to provide drainage. A second layer on top of the first layer may include 6 to 16 inches of recyclable material, for instance cardboard, paper, vegetable waste, coffee grounds, or other material subject to composting. A third layer of approximately 8 to 12 inches may include a suitable soil for gardening selected in view of plants that the gardener intends to grow. Each layer may slope downward 4 to 6 inches away from the feeding tube 14 to facilitate water flow from the feeding tube 14 to root structures closer to the outer edges of the base 12. Within the gardening soil, the gardener may plant a variety of different types of plants.

The feeding tube 14, in some embodiments, serves dual purposes. Water is applied to soil within the interior 56 through the interior 62 of the feeding tube 14, as compost material within the interior 62 of the feeding tube 14 composts, thereby forming a compost tea carried by the water into the soil to add nutrients, as well as forming additional soil as composting occurs for addition to the interior 56 of the gardening container 10. In operation, the gardener drops compost material into the interior 62 of the feeding tube 14, for example from the gardener's kitchen, or as the gardener trims organic material from the garden itself, such as weeds or plant clippings. This material composts within the feeding tube 14. Composting is enhanced by watering the garden through the feeding tube 14, as the water passes over and through the composting material, through the holes in the feeding tube 14, and out into the gardening media in the interior 56 of the base 12. As illustrated in FIG. 2, the back portion of the feeding tube support 38 in some embodiments is open to expose the apertures in the feeding tube 14 (not shown due to size) to the growing media. Relatively ergonomic access to the feeding tube 14 is provided by the gardener passage 34 (FIG. 1), through which the gardener passes when adding water or compost material.

From time to time, the gardener may remove material from the composting chamber of the feeding tube 14 (the lower portion of the interior), for instance when composting is complete and the material is sufficiently decomposed for use as soil. To this end, the gardener may enter the gardener passage 34, open the access panel 36, and scoop material from the bottom of the feeding tube 14 to add the material onto the top of soil in which plants are to be grown. Thus, some embodiments provide an integrated composter and raised bed garden between which waste material and composted material are relatively easily exchanged. Indeed, in some embodiments, the gardener can weed the garden, water the garden, add garden clippings to a compost pile, and add soil from the compost pile to the garden without walking more than a step or two from a single position.

Figure 5:
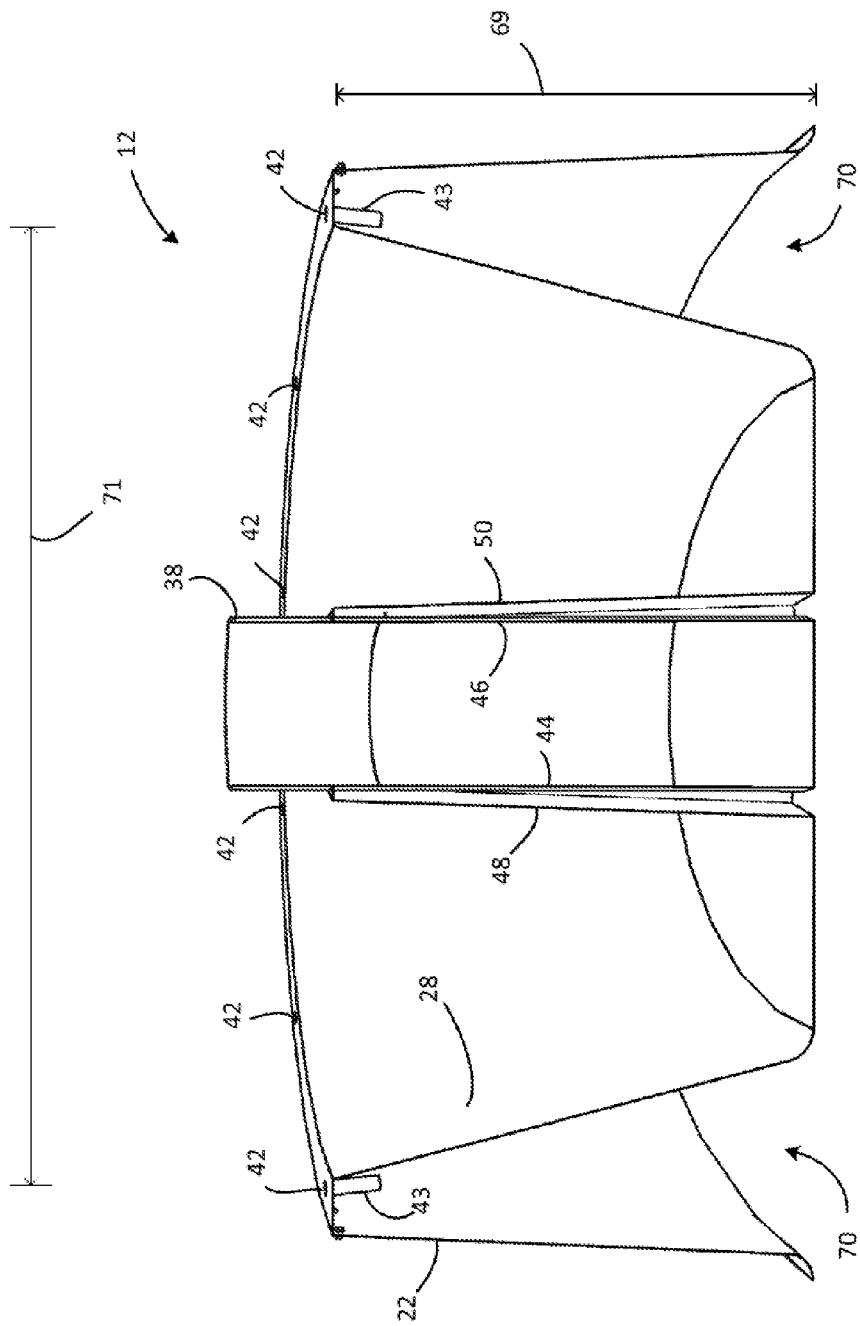
FIG. 5 is a side section view of the gardening container of FIG. 1.

The dimensions of the gardening container 10 may provide relatively ergonomic gardens. The height 69, as illustrated by FIG. 5, may be greater than 30 inches, e.g., between 36 and 48 inches, which is approximately waist high for most gardeners. Gardening media near this height is expected to be relatively easy for the gardener to reach. The diameter 71 (FIG. 5) is also selected with ergonomics in mind. In some embodiments, the diameter 71 is less than approximately one or two times a typical gardener's reach, such that substantially the entire surface of the garden can be reached from either the gardener passage 34 (FIG. 1) or from the perimeter of the gardening container 10. For instance, the diameter 71 may be between 3 feet and 8 feet, such as approximately 6 feet wide.

Figure 6:
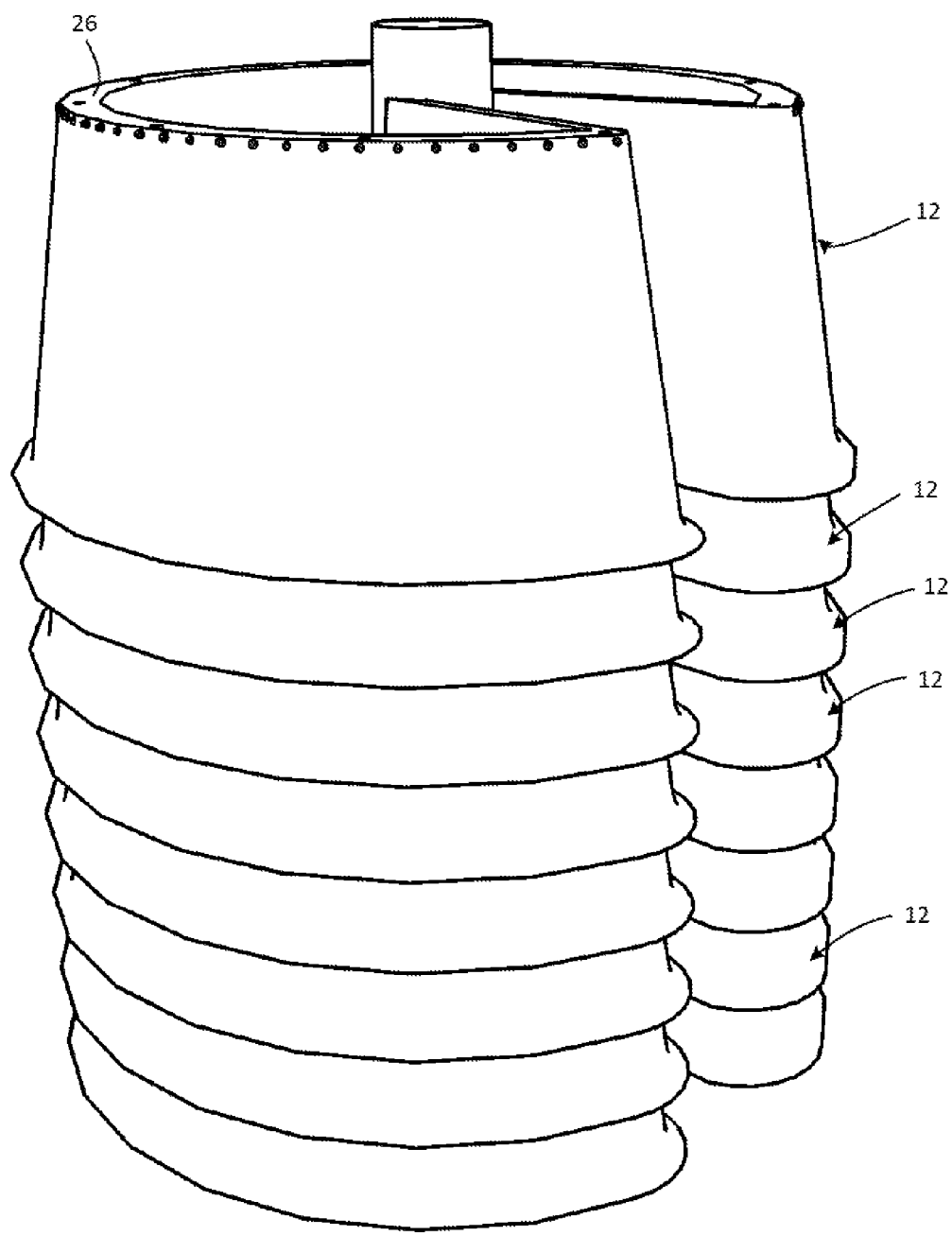
FIG. 6 illustrates a plurality of the gardening container of FIG. 1 in a stacked configuration.

A substantial cost of many relatively-large gardening containers is the cost of storage, both to the gardener when the gardening container is not in use, and to a retailer or a wholesaler storing a relatively large number of such containers. Certain embodiments are expected to reduce these costs by facilitating stacking of bases 12 of the gardening container 10. FIG. 6 illustrates a plurality of stacked gardening container bases 12. As illustrated, the top edge of each gardening container 26 is inserted into a wall interior 70 (FIG. 5). The wall interior 70 is formed in the region between the inner sidewall 28 and the outer sidewall 22 and generally has an inverted V-shape in cross-section, such that higher portions are narrower than lower portions. This shape is expected to facilitate the stacked configuration illustrated in FIG. 6. In some embodiments, the feeding tube support 38 and the sidewalls 44, 46, 48, 50 (FIGS. 1 and 2) also have an inverted V-shape to facilitate stacking. Bases 12 of FIG. 6 are said to be "stackable," because at least one half of the vertical height of one container fits inside another base 12 stacked on top of it. In some embodiments, the bases 12 may stack such that more than 80% of the height of the base fits within the above base, thereby further conserving storage space. While not all embodiments are stackable, stackable embodiments are expected to be less expensive in terms of storage costs. In some embodiments, the wall interior 70 is filled partially or substantially entirely with a removable insulator, e.g., fiberglass insulation (or other material having an R-value greater than approximately R-3), to dampen swings in the temperature of the gardening media.

Figure 7:
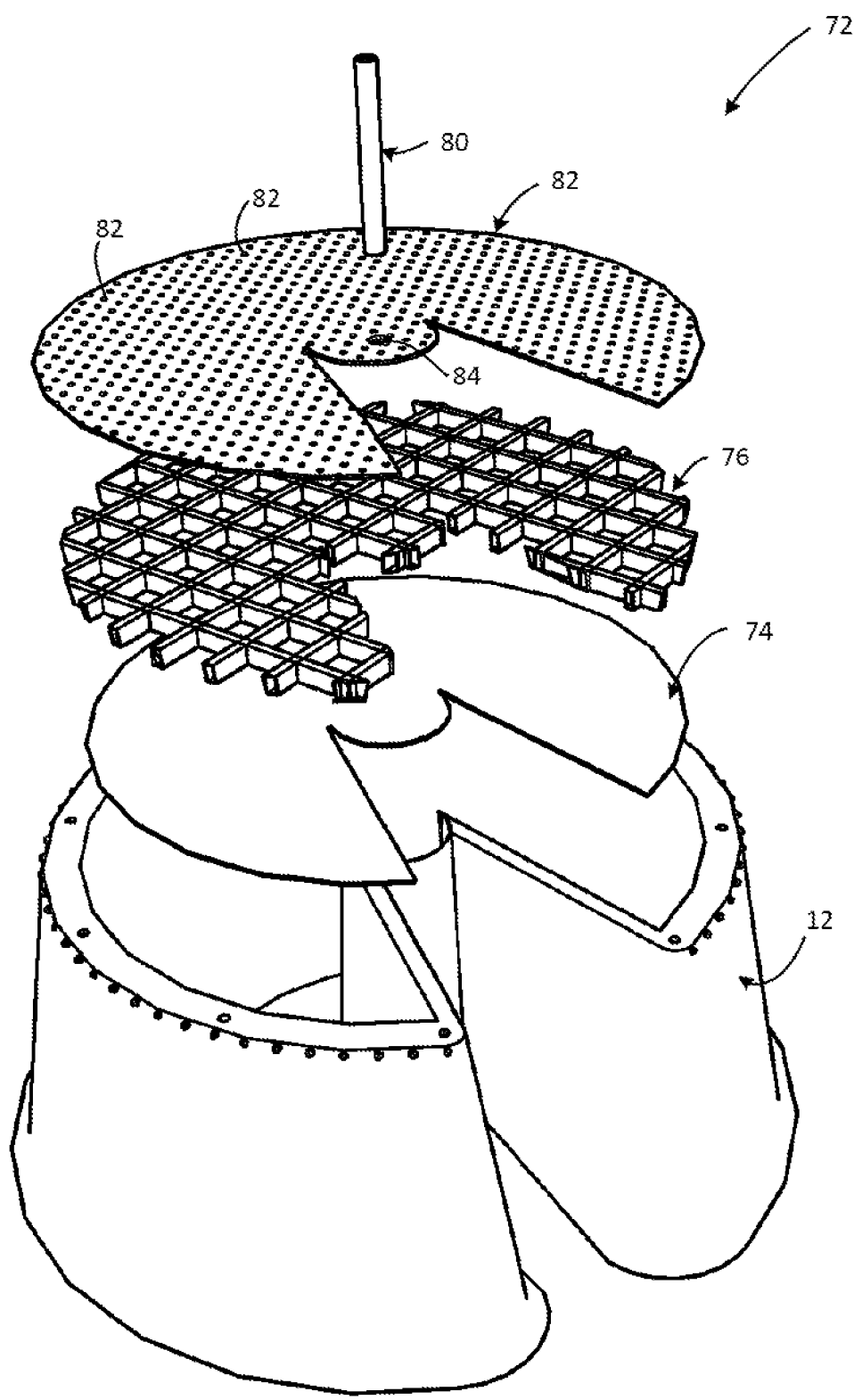
FIGS. 7 and 8 illustrate an exploded view of another gardening container in accordance with some embodiments of the present invention.

FIG. 7 illustrates another embodiment of a gardening container 72 in an exploded view. This embodiment includes an elevated surface 74, a support structure 76, a water permeable member 78, and a watering tube 80. As explained in greater detail below, the components of 74, 76, 78, and 80 may form an elevated water reservoir beneath the gardening media, which may maintain the moisture of the gardening media to facilitate plant growth.

In some embodiments, the elevated surface 74 is a waterproof sheet of material, such as machined or molded plastic or metal. The elevated surface 74 may be attached to support structure 76, for example by being bolting to the support structure 76 or by being welded to the support structure 76. The support structure 76, in this embodiment, is a grid of support beams 12, which may extend to a perimeter that is similar or identical to the interior of the base 12 discussed above. In some embodiments, the support structure 76 includes a plurality aluminum, steel, wood, composite, or plastic beams arranged in a grid. The support structure 76 may carry the load of the elevated base 74, water borne by the elevated base 74, as well as gardening media supported by the water permeable member 78. The support structure 76, in turn, may rest against the sides of the base 12, which may include a ledge or ridges to mate with the support structure 76. The water permeable member 78 may include an array of apertures 82 sized such that a gardening media generally does not fall through the apertures 82, but water may evaporate or otherwise be drawn out through the holes 82 into the gardening media. The water permeable member 78 may be a sheet of machined wood, plastic, or metal through which an array of holes 82 have been drilled, or the water permeable member 78 may be a plastic, wire, or fiber mesh.

Figure 8:
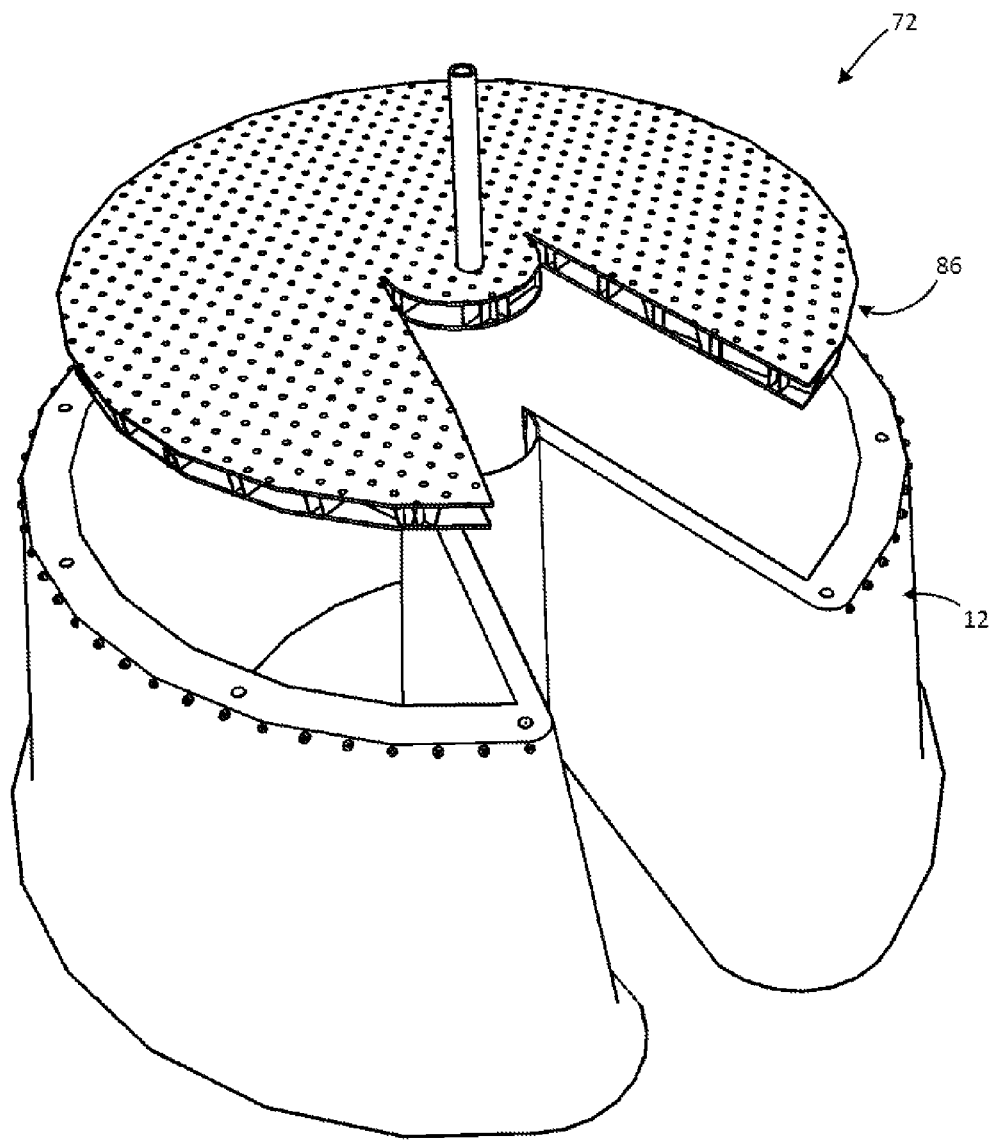
Figure 9:
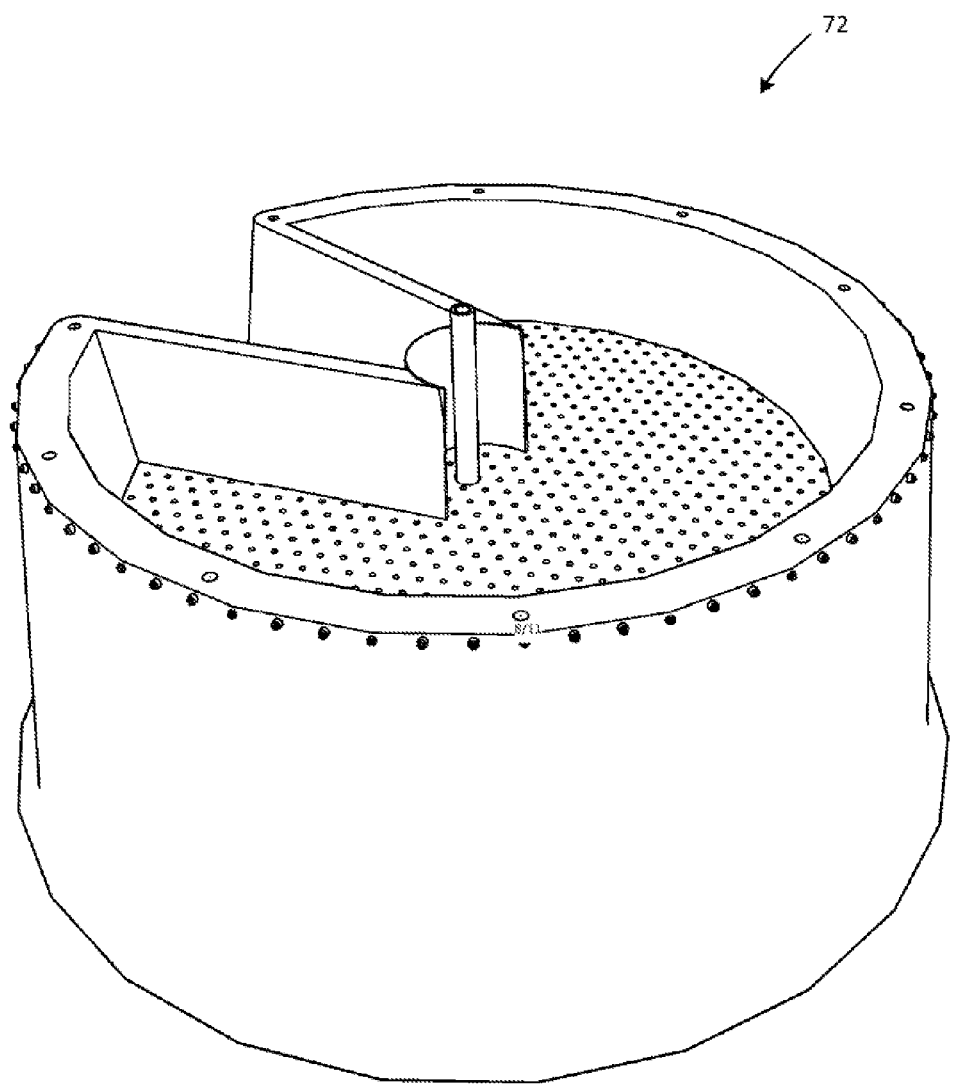
FIG. 9 is a perspective view of the gardening container of FIGS. 7 and 8.

The watering tube 80 may be approximately 3 feet long and may extend through a complementary aperture 84 in the water permeable member 78 into a volume defined by the water permeable member 78 and the elevated surface 74, as illustrated by FIG. 8. Together, these layers define a water reservoir 86 in which water is stored in the spaces around the support structure 76, which permits water to flow around its constituent beams. As illustrated in FIG. 9, the members 74, 76, 78, and 80 may be lowered into the base 12 to form an elevated water reservoir under the water permeable member 78, upon which gardening medium may be applied. The gardening media may draw water through the apertures 82, either through evaporation, or by filling the reservoir 86 such that water flows through the apertures 82, thereby applying a relatively uniform and relatively constant source of moisture to the gardening media. Water reaches the reservoir 86 through the watering tube 80, which extends through the gardening media, into the space between the water permeable member 78 and the elevated support 74. The elevated support 74 may rest on a ledge extending around the interior of the base 12, which may include a seal to limit the escape of water, or the elevated support 74, in some embodiments, may be integrally formed in the interior of the base 12 or be formed in a cup-shape, such that the support structure 76 and the water permeable member 78 sit within the volume defined by the elevated support 74, which may also be referred to as a pan.

In operation, the gardener may apply a gardening media over the top of the water permeable member 78 and, then, plant within the gardening media. The watering tube 80 may be a two-inch tube that extends through the gardening media to a height such that the gardener has access to the top of the tube 80. The gardener may add water to the top of the watering tube 80, and the water may flow through the tube 80, through the water permeable member 78, and accumulate in the reservoir 86 above the elevated support 74. This accumulated water may then evaporate or, if enough water is supplied, flow through the apertures 82 into the gardening media, thereby watering the plants and providing a relatively large supply of water from which the plants may draw moisture. In some embodiments, a wicking material may extend through the apertures 82 into the reservoir 86, for example cotton rope, twine, or other fibers. The wicking material may draw water from the reservoir 86 into the gardening media above through capillary action, thereby providing water to the roots of plants. By providing a steady supply of water from a relatively large reservoir (e.g., more than 5 gallons) gardening container 72 is expected to extend the periods between watering sessions by gardeners, thereby simplifying the gardening process.

Embodiments of the gardening container 12 are not limited to those having a generally circular base. For instance, some embodiments have a rectangular shape, as illustrated by gardening container 88 in FIGS. 10 and 11. The base 90 of gardening container 88, like the previous embodiments, is tapered and is stackable. The width 92 of the base 90 may be selected such that a typical person can reach across the base 90 to garden while leaving room for plants, e.g., the width 92 may be less than 30 inches and more than 10 inches, such as near or exactly 20 inches. The length 94 of the base 90 may be greater than or equal to the width 92 in some embodiments, e.g., over 40 inches. In some embodiments, the length 94 and width 92 may be approximately or exactly equal, forming a square shape, and access from the ends of the base 90 may facilitate use of larger dimensions, e.g., the sides may be greater than 20 and less than 60 inches, such as approximately or exactly 40 inches.

Figure 10:
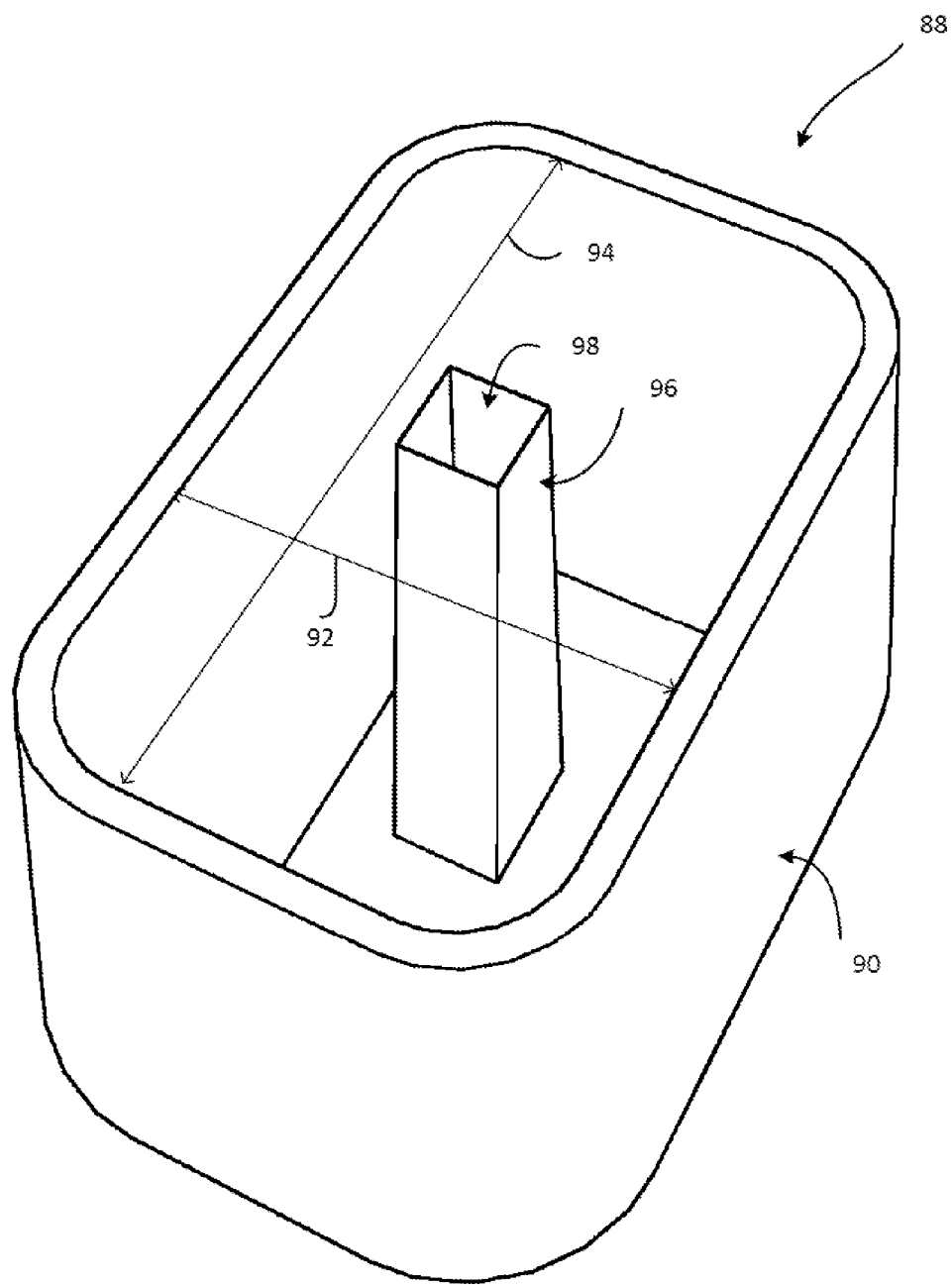
FIGS. 10 and 11 are perspective views of another embodiment of a gardening container.
Figure 11:
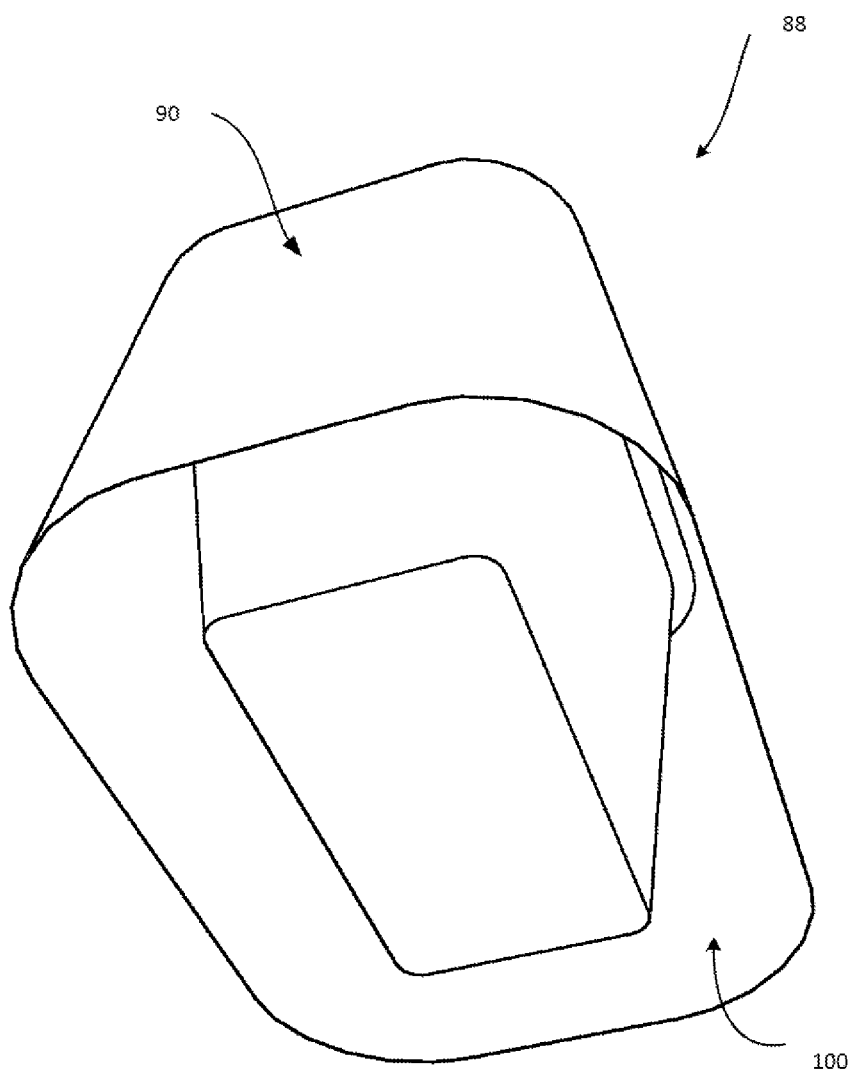

The illustrated embodiment of FIGS. 10 and 11 includes a tapered feeding tube 96, e.g., an inverted frustum of a rectangular pyramid, positioned near or at the center of the base 90. In some embodiments, the feeding tube 96 may have other shapes, such as those discussed above. The tube 96 includes a top aperture 98 and a plurality of apertures near its base (e.g., an array of approximately half inch apertures within two feet of the bottom of the tube 96 to facilitate flow of water through composting material into the gardening media. As with previous embodiments, the height of the gardening container 88 may be greater than approximately 36 inches to facilitate access to plants (though embodiments are not limited to containers in this height range), and the space between the walls may define a hollow side-wall interior 100 (FIG. 11) to facilitate stacking. Other embodiments may have other shapes than rectangular and circular, such as those defined by other regular polygons (e.g., a triangle, a pentagon, a hexagon, or an octagon) and those defined by irregular polygons (e.g., a trapezoid, a C-shape, or a W-shape). Having two or more relatively straight sides is expected to facilitate use of the gardening container 88 near corners, e.g., near the corner of an apartment balcony.

Figure 12:
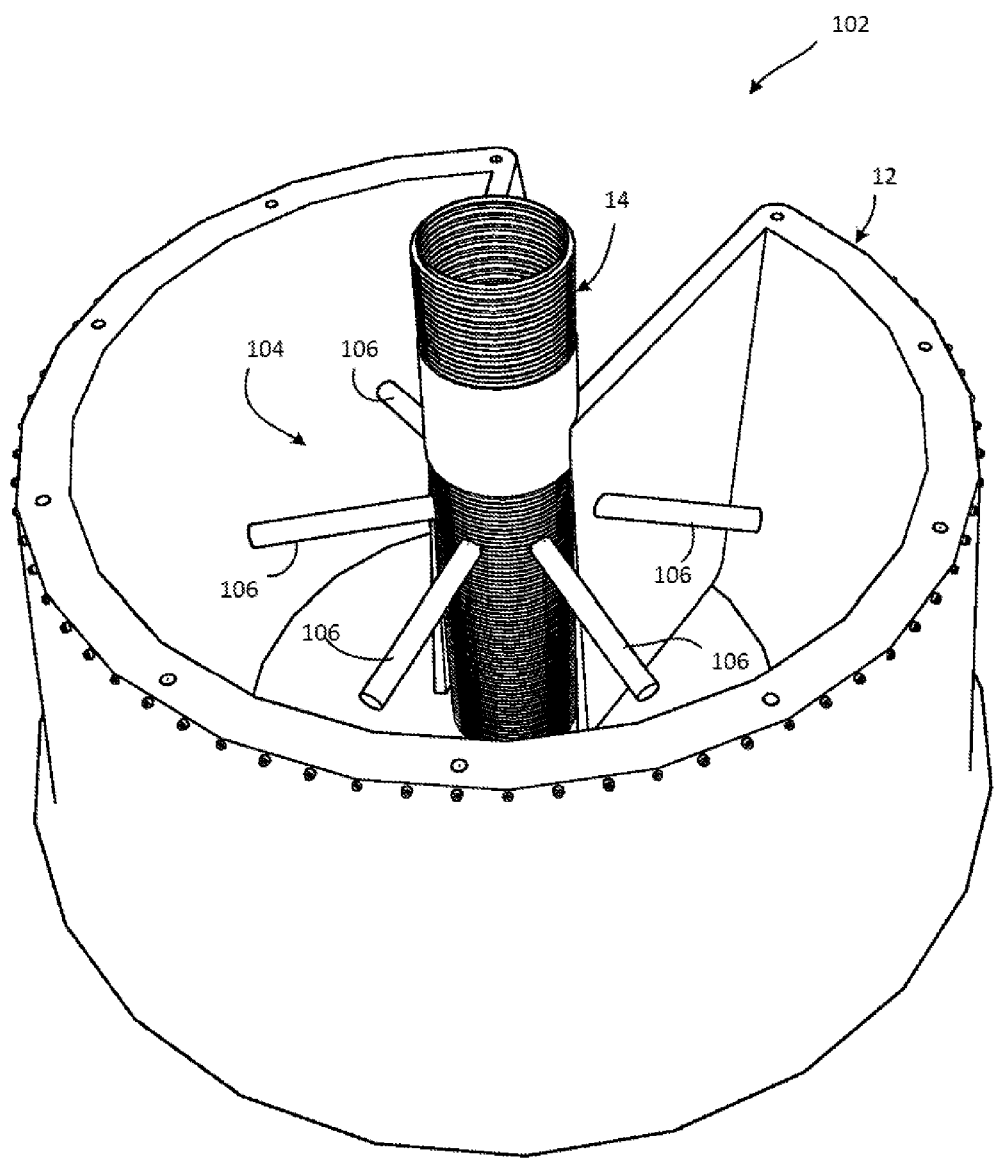
FIG. 12 is a perspective view of a gardening container with a water disperser.
Figure 13:
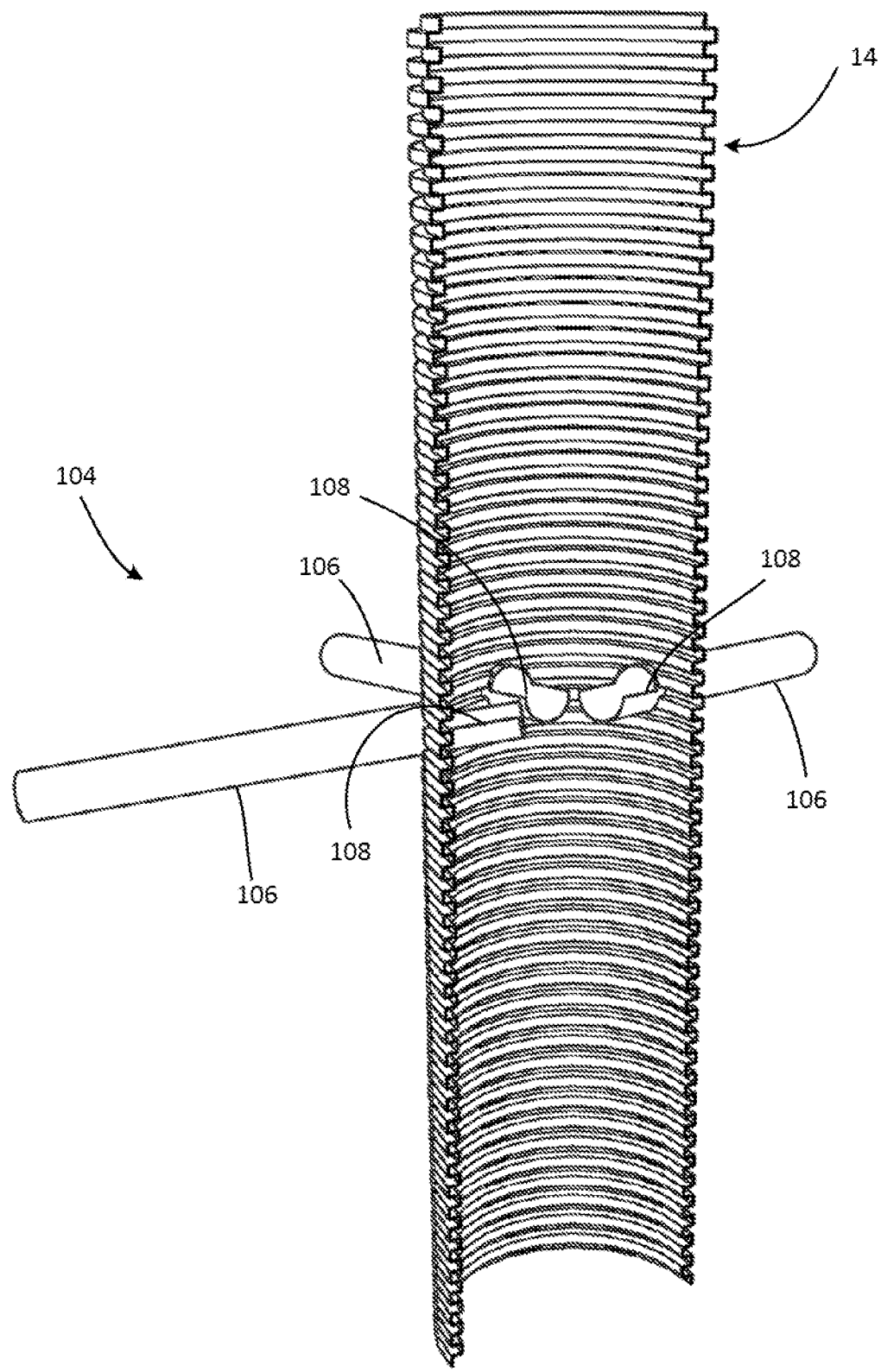
FIG. 13 is a sectioned perspective view of the water disperser of FIG. 12.

FIGS. 12 and 13 illustrate another embodiment of a gardening container 102 having a water disperser 104. In this embodiment, the water disperser 104 includes a plurality of tubes 106 radially symmetrically disposed within the base 12 and extending through the side of the feeding tube 14. As illustrated in FIG. 13, each tube 106 (which in this embodiment is generally a right circular cylinder, and which may have other shapes), extends outward and is sloped downward to distribute water radially into the gardening media. The end of the tubes 106 within the feeding tube 14 includes an upper aperture 108 for catching water added to the feeding tube 14, and the distal portions of the tubes 106 include one or more apertures near a bottom portion of the tubes (not shown) for directing water into the gardening media while impeding the flow of gardening media into the tubes 106 (e.g., an array of ½ inch apertures). In operation, water is added to the top of the feeding tube 14, and the water flows down into the upper apertures 108. The water then is directed radially outward, toward the distal portions of the tubes 106, due to the tubes 106 downward slope, and the water flows out of apertures in the bottom portion of the tubes 106 into the gardening media. The water disperser 104 is expected to disperse water in the gardening media more evenly that systems without such a feature, thereby potentially enhancing plant growth throughout the gardening container 102.

It should be understood that the description and the drawings are not intended to limit the invention to the particular form disclosed, but to the contrary, the intention is to cover all modifications, equivalents, and alternatives falling within the spirit and scope of the present invention as defined by the appended claims. The term "gardening" herein is not limited to hobbyist pursuits and encompasses agricultural activities in general, including activities on farms. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors.

What is claimed is:

1. A gardening container, comprising: a base for a raised-bed gardening container, the base being a single substantially fluid-impervious body of a single material and comprising: a bottom edge; a top rim above the bottom edge; an exterior sidewall extending between the bottom edge and the top rim; an interior sidewall extending from the top rim to a bottom interior, the interior sidewall and bottom interior defining an interior volume for containing a gardening media, the interior volume having a diameter of greater than approximately four feet; a single substantially fluid-impervious feeding tube support generally centrally disposed in the base and comprising a compost access panel; and a gardener passage extending to and in contact with the feeding tube support and having a width configured to allow a gardener to walk through the gardener passage to the feeding tube support; a single substantially fluid-impervious feeding tube configured to be directly coupled to the feeding tube support at a height at or above the top rim, and residing approximately centrally within the interior volume to collect compost and convey water into the gardening media, wherein the feeding tube comprises: a plurality of apertures operable to convey water into the gardening media; and an upper aperture disposed adjacent the gardener passage when the feeding tube is coupled to the feeding tube support and operable to receive water and compost material; and wherein said feeding tube further comprises an aperture behind said access panel through which processed compost can be removed, wherein said access panel and aperture are positioned at a height where fluids collecting at the bottom of said feeding tube flow into the gardening medium before reaching a bottom edge of said compost access panel to prevent draining through said access panel; and a circular plate near the bottom of said feeding tube configured to allow lifting of compost up to at least said access panel; and a cover frame configured to be coupled to the base and support a protective cover over the interior volume of the base.

2. The gardening container of claim 1, wherein the base is stackable such that a bottom base among a pair of substantially identical bases is shaped to fit within a wall interior of a top base, wherein said feeding tube support of said bottom base is partially arranged within said feeding tube support of said top base, and the bottom base is more than approximately 50 percent overlapped by the top base.

3. The gardening container of claim 1, wherein the base comprises a thermoplastic polymer.

4. The gardening container of claim 1, wherein the bottom edge flares radially outward from the exterior sidewall.

5. The gardening container of claim 1, wherein the exterior sidewall approximately defines a frustum of a right circular cone and the interior sidewall approximately defines an inverted frustum of another right circular cone.

6. The gardening container of claim 1, wherein the gardener passage has a width of greater than 1 foot and a length of greater than 3 feet.

7. The gardening container of claim 1, comprising a cover selected from among the following: a translucent plastic sheet, shade cloth, deer netting, or a combination thereof.

8. The gardening container of claim 1, wherein the feeding tube comprises a corrugated pipe, and wherein the plurality of apertures operable to convey water are smaller than or equal to approximately one-half inch.

9. The gardening container of claim 1, wherein the top rim defines a plurality of apertures configured to receive the cover frame to hold the cover frame in fixed relation to the base.

10. The gardening container of claim 1, wherein the base comprises a plurality of fasteners configured to couple the cover to the base.

11. The gardening container of claim 1, wherein the bottom interior is a bottom closed interior surface that cooperates with the interior sidewalls to form a container from the interior volume.

12. The gardening container of claim 1, wherein the bottom interior is an opening configured to mate with the ground to form a container defining the interior volume.

13. The gardening container of claim 1, wherein the base is a single substantially fluid impervious sheet of polypropylene.

14. A gardening container, comprising: a base being a single substantially fluid-impervious body of a single material and comprising: an exterior sidewall sloping in a direction; an interior sidewall sloping in an opposing direction and defining an interior volume for containing a gardening media; and a gardener passage extending to and in contact with a single substantially fluid-impervious feeding tube support and having a width configured to allow a gardener to walk through the gardener passage to the feeding tube support, wherein said feeding tube support comprises a compost access panel, wherein the base is stackable such that a plurality of substantially identical bases, when stacked, each contain more than 50 percent of an adjacent base, and wherein, when stacked, said feeding tube support of said bottom base is partially arranged within said feeding tube support of said top base; a single substantially fluid-impervious feeding tube configured to be directly coupled to said feeding tube support, wherein said feeding tube further comprises an aperture behind said access panel through which processed compost can be removed, wherein said access panel and aperture are positioned at a height where fluids collecting at the bottom of said feeding tube flow into the gardening medium before reaching a bottom edge of said compost access panel to prevent draining through said access panel; an elevated surface configured to contain a water reservoir beneath a gardening media within the interior volume; a water permeable member configured to separate the gardening media from the water reservoir; a support member arranged between said elevated surface and said water permeable member, said support member being engaged with said side wall for supporting said elevated surface and said water permeable member; and a single substantially fluid-impervious watering tube which extends though said water permeable member into said water reservoir, thereby enabling water to be received in said water reservoir.

15. The gardening container of claim 14, comprising:
a cover frame coupled to the base; and
a cover draped over the cover frame and coupled to fasteners on the base.

16. The gardening container of claim 15, comprising a water disperser coupled to the feeding tube, wherein the water disperser comprises a plurality of tubes having an upper aperture within the feeding tube and extending radially outward into the base.

17. The gardening container of claim 14, comprising:
wherein the exterior sidewall is colored and shaped to simulate a material selected from among the following: brick, wood, stone, or a combination thereof.

18. A gardening container, comprising: a base being a single substantially fluid-impervious body of a thermoplastic and comprising: a bottom edge; a top rim above the bottom edge; an exterior sidewall extending between the bottom edge and the top rim; an interior sidewall extending from the top rim to a bottom interior, the interior sidewall and bottom interior defining an interior volume for containing a gardening media, the interior volume having a diameter of greater than approximately four feet; a single substantially fluid-impervious feeding tube support generally centrally disposed in the base and comprising a compost access panel; and a gardener passage extending to and in contact with the feeding tube support and having a width configured to allow a gardener to walk through the gardener passage to the feeding tube support; a single substantially fluid-impervious feeding tube configured to be directly coupled to the feeding tube support at a height at or above the tip rim, and residing approximately centrally within the interior volume to collect compost and convey water into the gardening media, wherein the feeding tube comprises: a plurality of apertures operable to convey water into the gardening media; a top aperture disposed adjacent the gardener passage and operable to receive water and compost material; and wherein said feeding tube further comprises an aperture behind said access panel through which processed compost can be removed, wherein said access panel and aperture are positioned at a height where fluids collecting at the bottom of said feeding tube flow into the gardening medium before reaching a bottom edge of said compost access panel to prevent draining through said access panel; and a cover frame coupled to the base and supporting a protective cover over the interior volume of the base; and a plurality of layers of gardening media disposed within the interior volume, the plurality of layers comprising: a bottom layer of porous material configured to provide drainage: a second layer on the bottom layer of recyclable material subject to composting; a third layer of soil on the second layer, wherein the bottom layer, the second layer, and the third layer slope downward four to six inches away from the feeding tube; compost material disposed within the feeding tube, adjacent the plurality of apertures in the feeding tube such that water added through the top aperture passes through the compost material and carries a compost tea in the gardening media, wherein, said base is stackable such that a plurality of substantially identical bases, when stacked, each contain more than 50 percent of an adjacent base, and wherein, when stacked, said feeding tube support of said bottom base is partially arranged within said feeding tube support of said top base.

\* \* \* \* \*